Feb. 13, 1962 B. L. LAWRENCE 3,021,470
TRANSISTORIZED CHOPPER CIRCUIT
Filed June 3, 1959
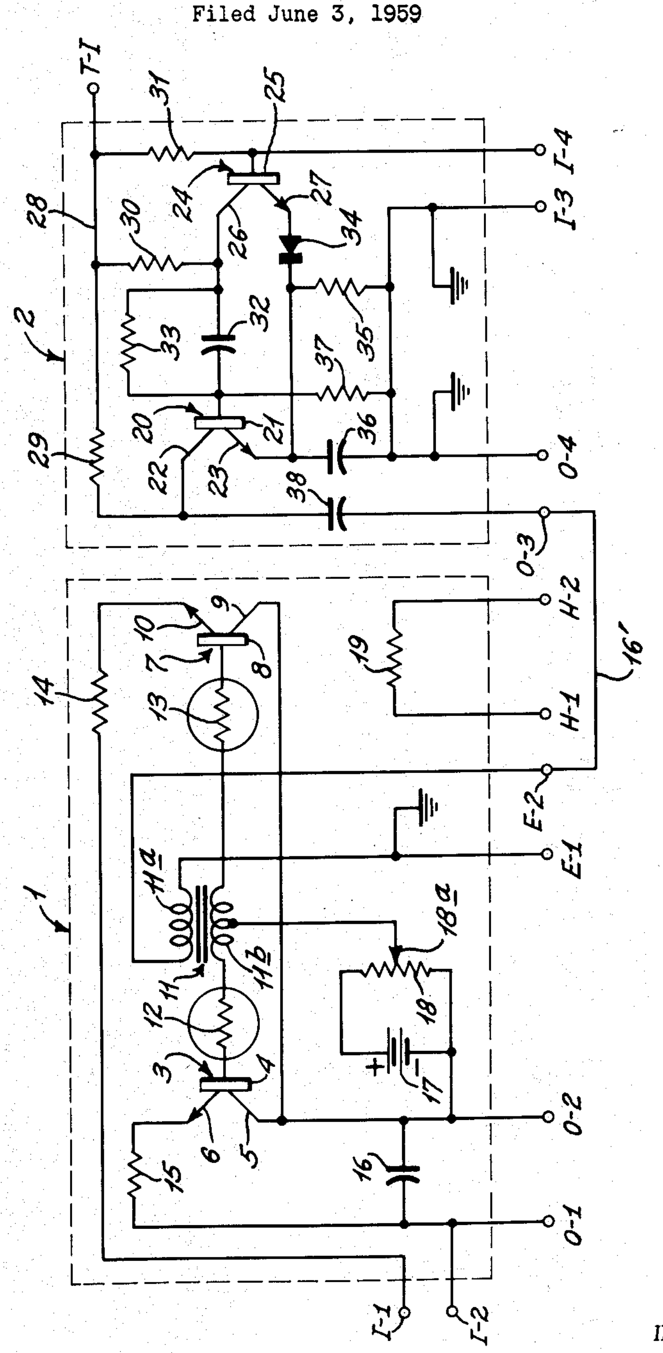
INVENTOR
Billy L. Lawrence
BY Stevens, Davis, Miller & Mosher
ATTORNEYS United States Patent Office 3,021,470
Patented Feb. 13, 1962

3,021,470

TRANSISTORIZED CHOPPER CIRCUIT

Billy L. Lawrence, Dallas, Tex., assignor to Texas Instruments Incorporated, Dallas, Tex., a corporation of Delaware Filed June 3, 1959, Ser. No. 817,767
3 Claims. (Cl. 321—16)

This invention relates to electronic instrumentation, and more particularly to transistorized circuitry for producing an alternating output voltage with a magnitude proportional to the amplitude of a unidirectional input signal.

In modern day electronic instrumentation systems, it is often necessary to employ condition-responsive sensors to sample a given environment and produce error signals which are indicative of the conditions encountered therein. These error signals may take the form of minute unidirectional potentials which are characterized by amplitudes which reflect deviations from a pre-set datum level. For instance, strain gages are oftentimes used to detect physical deflections in a given structural element, while thermocouple units are employed to quantitatively indicate the amount of deviation from a predetermined temperature datum. Devices such as strain gages and thermocouples function to produce a low level unidirectional error voltage which may be of the order of millivolts or microvolts.

In order to properly utilize such error signals, it is commonly necessary to amplify and substantially increase the amplitude thereof prior to use in subsequent stages of circuitry. Where the amplification of these error signals is accomplished with D.-C. amplifiers, as is well known to those skilled in the art, there is a variety of practical and operational problems which must be contended with. The operational difficulties which characterize the use of such D.-C. amplifiers are known to those versed in the field of electronic instrumentation. For instance, this type of amplifying system is notoriously subject to drift and is extremely difficult to stabilize.

For these reasons, the performance of A.-C. amplifiers is regarded as inherently superior in electronic instrumentation systems. In order to render the use of such A.-C. amplifiers possible, it is common to employ circuitry and components for transforming the unidirectional error signal into an alternating type signal. The amplitude of the A.-C. signal or square wave thus produced is proportional to the magnitude of the unidirectional error potential produced by the condition-responsive sensors. However, the amplification of the signal in A.-C. form, and its use in the successive changes of circuitry required for generating correctional signals is substantially more trouble-free.

Use of vacuum tube systems for converting the low level unidirectional error signal to an alternating signal is limited, since they cannot be used where the signals sought to be amplified are of a magnitude which is not significantly greater than the potentials caused by random noise phenomena within the vacuum tubes. Under such conditions, the low amplitude error signal may be lost or greatly obscured by the unwanted tube noise potentials within such a system.

In prior art systems, it is known to employ mechanical or vibratory reed-type choppers which transform the unidirectional error potential into an alternating type output signal. However, the operational characteristics of such mechanical type choppers have not been entirely satisfactory. For instance, the inertia of the moving element in such vibratile units oftentimes causes the reed or movable part to bounce or chatter. Such bouncing can cause undesirable transients in the system which renders any measurement of the amplitude of the resulting alternating voltage more complicated and obscures the data. Another complicating factor in the mechanical type choppers is sometimes occasioned by the occurrence of tiny arcs between the contacts bridged by the vibratory reed. Since any such arcing phenomenon occasions a waste of power from the source, the advantage of a system which can prevent the occurrence of such disruptive discharge phenomena is obvious.

The frequency limitations which are occasioned by the inertia or mass of vibratory reed type choppers must also be regarded as a limiting factor in their use. There is a definite upper frequency limitation which characterizes the use of such chopper units because of the inherent inertia associated therewith.

According to the present invention, means are provided for converting an extremely low level unidirectional signal into a square wave potential of magnitude proportional to the input magnitude. With the inventive system, the input voltage may be as low as 50 microvolts positive or negative. This, of course, is well below the random noise level for conventional vacuum tubes. In practicing the invention, the output square wave is centered about a reference line of zero potential with positive and negative pulses symmetrically disposed above and below to form a square wave having an amplitude which is proportional to that of the D.-C. input signal. This input signal may be either a constant or a slowly changing D.-C. voltage of either positive or negative polarity. Whenever the input signal polarity changes from positive to a negative value or vice versa, the output signal produced by the inventive circuitry exhibits a phase shift of 180°.

According to the current invention, there is provided a transistorized chopper circuit which employs two transistors. A square wave power source is employed for switching the transistors. This power source is transformer coupled to the base leads of the two transistors. The square wave which is supplied the transformer may be provided by a transistorized Schmitt trigger circuit or the like. The output of the transistorized chopper circuit comprises a square wave potential with a condition responsive magnitude. The input to the Schmitt trigger circuit which develops the square wave switching potential for the transistors may comprise a sinusoidal input wave form having a frequency as high as 30 kilocycles.

In the inventive circuit, a D.-C. bias is applied to the base of the transistors. This D.-C. bias has the purpose of causing the transistors to switch when the square wave is applied, and balances both transistors to zero output when no signal is applied to the input terminals.

Accordingly, therefore, a primary object of the present invention is to provide a transistorized chopper circuit capable of producing an alternating type output voltage with a magnitude proportional to the amplitude of a unidirectional input signal.

Another object of the invention is to provide a novel scheme of circuit components and transistors for use in transforming a low level error signal into an alternating type voltage suitable for application to A.-C. amplifiers.

These and other objects of the present invention will become apparent by referring to the single drawing which accompanies the present specification.

Turning now to the single drawing which accompanies the present patent specification, the reference numeral 1 has been used to indicate generally the circuit of the transistorized chopper circuit of the present invention. In the right-hand portion of the diagram, the numeral 2 has been used to designate generallly a square wave generator used to derive switching potentials for the chopper circuit.

In the left-hand portion of the chopper circuit, there is illustrated a pair of signal input terminals I–1 and I–2. The terminals I–1 and I–2 are suitable for connection to a source of low level unidirectional potential.

In the central portion of the chopper circuit, a transistor identified generally by the reference numeral 3 is illustrated. The transistor 3 is of conventional type and will be seen to include a base electrode 4, a collector electrode 5, and an emitter electrode 6. Immediately to the right of this transistor, a second transistor 7 is shown. The transistor 7 similarly includes a base electrode 8, a collector electrode 9, and an emitter electrode 10. Between the transistors 3 and 7, there is provided a transformer 11 which includes a primary winding 11*a* and a center-tapped secondary winding 11*b*. One end of the secondary winding 11*b* is connected to the base electrode 4 of transistor 3 through a thermo-sensitive resistor 12. The thermo-sensitive resistor 12, as well as other thermo-sensitive resistors to be referred to hereafter, are resistors having a positive temperature coefficient such as is presently marketed by Texas Instruments Incorporated under the trademark Sensister. The opposite end of the secondary winding is connected to the base electrode 8 of the transistor 7, via a thermo-sensitive resistor 13.

The positive temperature coefficients of thermo-sensitive resistors 12 and 13 connected in the base circuits of the transistors 3 and 7 assist in compensating for the effect of temperature changes in and around the unit. This is readily accomplished since with increase in heat, a decrease in the base-to-collector voltage is necessary in order to maintain zero signal output with zero signal input. To prevent an unbalance in the individual transistor temperatures, a common heat sink may be used for the two thermo-sensitive resistors 12 and 13. This heat sink may take the form of a conductive metallic mass such as a bolt or strap positioned externally of the unit and connected to experience heat flow from the thermo-sensitive resistors 12 and 13.

Continuing with the detailed description of the invention, it will be observed that the signal input terminal I–1 is connected to the emitter 10 of the right-hand transistor 7 through a resistor 14. The input terminal I–2, on the other hand, is connected to the emitter 6 of transistor 3 through a resistor 15.

The resistors 14 and 15 shown in the diagram are for temperature stabilization purposes. These resistors have the function of minimizing changes in the collector currents in the transistors. The stability with temperature of the transistorized chopper is markedly enhanced by the use of these resistors, and the linearity of the chopper is not adversely affected thereby.

In order to render the square wave signal produced by the chopper available for the subsequent stages of circuitry, there is provided a pair of output signal terminals O–1 and O–2. The first of these terminals O–1 is connected to the emitter 6 of transistor 3 by way of resistor 15.

The output signal terminal O–2, on the other hand, is conductively tied directly to the collector electrodes 5 and 9 of transistors 3 and 7 respectively. Moreover, a capacitor 16 is connected in shunt across the output signal terminals O–1 and O–2 in order to minimize the transfer of noise potentials to any subsequent stages of circuitry connected to utilize the square wave potential produced by the chopper.

In order to provide proper biasing potentials, the chopper circuit includes a D.-C. voltage source 17 which is connected to produce current flow through a potentiometer 18. The potentiometer includes a slider tap 18*a* which is connected directly to the center tapped secondary winding 11*b* illustrated directly thereabove.

The bias voltage which is applied to the center tap of the secondary 11*b* is regulated and is variable. The initial adjustment of the chopper with zero error signal input may be set by varying the slider on 18*a* for a null as viewed on an oscilloscope, with the output of the chopper connected to a typical load such as a 2,000 ohm resistor. After this adjustment is made, it is not necessary to alter the bias voltage unless the supply voltage varies or the original setting is altered.

In addition to supplying a bias voltage, the voltage source 17 in conjunction with the potentiometer 18 when adjusted in the above-described manner effectively compensates for differences in transistor characteristics. Therefore, it is not necessary that the characteristics of the two transistors be closely matched. Also, this voltage effectively cancels the small output voltage which is developed due to the inherent characteristics of a P-N junction, even though there is zero error signal input.

However, it must be realized that in some applications the voltage source 17 and potentiometer 18 may be eliminated by choosing transistors with sufficiently low and closely matched betas and $I_{co}$'s.

In FIGURE 1, the primary winding of the transformer 11, which switches the transistors 3 and 7, is connected to receive exciting square wave potentials via terminals E–1 and E–2. The terminal E–1 is maintained at the common ground potential for the system. The terminal E–2, on the other hand, receives an exciting potential from the square wave generator 2 shown in the right-hand portion of the drawing by way of conductor 16.

In order to further stabilize the electrical response of the inventive system by eliminating extreme changes in temperature, a heater element 19 is included in the chopper circuit. The element 19 is comprised of a number of turns of resistive wire mounted to produce heat for the purpose of stabilizing the ambient temperature of the environment in which the chopper is located. The ends of the heater element 19 terminate at a set of terminals H–1 and H–2 which may be connected to a suitable source of energizing potential. The heater 19 is thermostatically controlled to maintain a constant ambient temperature.

Turning now to the detailed description of the remaining portion of the system, reference to the square wave generator 2 in the right-hand portion of the drawing will now be made. The circuitry and components designated by the numeral 2 will be recognized by those skilled in the art as comprising a transistorized Schmitt trigger circuit. This trigger circuit includes a conventional transistor identified generally by the reference numeral 20. The transistor 20 is provided with the usual base electrode 21, collector electrode 22, and emitter electrode 23. Somewhat to the right, another conventional transistor is designated generally by the reference numeral 24. The transistor 24 is similarly provided with a base electrode 25, a collector electrode 26, and an emitter electrode 27. Directly above the transistors 20 and 24, a common bus 28 is connected to an exterior terminal T–1 which provides access to a source of positive operating potential. A potential of the order of 28 volts D.C. has been found suitable for use in practicing the invention.

Within the square wave generator 2, it will be observed that the collector electrodes 22 and 26 are each connected to the common bus 28 by means of resistors 29 and 30 respectively. The base electrode 25 of transistor 24 is coupled to the common bus 28 by means of a resistor 31. The base electrode 21 of the left-hand transistor 20, on the other hand, is coupled to the collector electrode 26 of the right-hand transistor by means of a capacitor 32 and a resistor 33 connected in parallel. In addition, the emitter electrode 23 of the left-hand transistor 20 is coupled to the emitter 27 of the transistor 24 through a diode 34. The diode 34 is grounded through a resistor 35 and a capacitor 36 connected in parallel. The base electrode 21 of transistor 20 is also grounded through a resistor 37. The input signal for the generator 2 is applied at input signal terminals I–3 and I–4. This input signal will normally be a sinusoidal wave of the desired frequency. The output of the generator is made available at output signal terminals O–3 and O–4. The output will be a square wave of the same frequency as the input signal. Although the driving circuit herein described is a Schmitt trigger circuit, it is obvious that any means for applying a square wave signal to the circuit of the invention will suffice.

Thus, it will be seen that in the operation of the circuit, the transistors 3 and 7 will be switched into conduction alternately by the signals from the trigger circuit 2 transformer coupled to the bases of the transistors 180° out of phase. The signal appearing at the output terminals O–1 and O–2 is a square wave at the frequency of the trigger circuit 2 and having an amplitude proportional to the difference in potential between the two emitters, i.e., the input D.-C. signal applied to input terminals I–1 and I–2.

By reference to that portion of the figure of the drawing included within the block outline identified by reference numeral 1, a description of the operation of the circuit of this invention may be followed. There are two conditions under which the operation of this circuit will be examined: (*a*) when the input signal across I1—I2 is a D.-C. voltage level applied so as to make I1 positive with respect to I2 and the output is a positive going A.-C. square wave signal of the same potential; and (*b*) when the input signal across I1—I2 is a D.-C. voltage level applied so as to make I1 negative with respect to I2 and the output is a negative going A.C. square wave signal of the same potential. The operation under these conditions are as follows:

(*a*) When the input D.-C. signal at I–1 is positive and the square wave A.-C. supply to coil **11*b* (a part of transformer 11) is such that the potential at the base of transistor 3 is positive and the base of transistor 7 is negative (and therefore cut-off) then there will be a zero potential across the output terminals O–1 and O–2. There will be a circulation of current in the loop comprising the left half of coil 11*b*, resistor 12, transistor 3, potentiometer 18, potentiometer slider 18*a* and the center tap of coil 11*b***.

At an instant later the square wave A.-C. supply to coil **11*b* (from primary 11*a*) changes polarity and thus provides a negative potential at the base of transistor 3 (cutting off transistor 3) and a positive potential at the base of transistor 7 causing transistor 7 to conduct. A circuit is then completed from input terminal I–1 through transistor 7 and out collector lead 9 to the lead connecting with output O–2 and by-passing transistor 3 which is cut off. There is also a small circulation of current through the loop including the right half of coil 11*b*, transistor 7, potentiometer 18, potentiometer slider 18*a* and the center tap of coil 11*b*. A complete operative output (positive pulse) circuit is then completed through the output terminal O–2 to output terminal O–1 and back to the input terminal I–2 which is electrically the same as O–1 (I–2 is of course negative when I–1** is positive).

(*b*) When the input D.-C. signal at I–1 is negative and the square wave A.-C. supply to coil **11*b* (via transformer 11) is such that the potential at the base of transistor 3 is positive and the base of transistor 7 is negative (and therefore cut off) then there will be a zero potential across the output terminals O–1 and O–2. There will be a circulation of current in the loop comprising the left half of coil 11*b*, resistor 12, transistor 3, potentiometer 18, slider 18*a*, and the center tap of coil 11*b***.

At an instant later the square wave A.C. supply to coil **11*b* (through primary 11*a*) changes polarity and this provides a negative potential at the base of transistor 3 (cutting off transistor 3) and a positive potential at the base of transistor 7 causing this transistor to conduct. A circuit is then completed from input terminal I–2 through the output terminal O–1 and across the output load and back through output terminal O–2 to the lead connecting with collector 9 and through the now conducting transistor 7 and back to the negative side of the input at terminal I–1**. This provides a negative going pulse across the output load circuit.

While I have, therefore disclosed my invention in such full, clear, and concise terms as will enable those skilled in the art to practice and understand it, it will be readily obvious that various modifications, substitutions, and alterations may be made therein without departing from the spirit and scope of the appended claims.

What is claimed is:

1. In a transistorized chopper circuit for converting a low level unidirectional input voltage to an alternating type output potential; a first transistor provided with base, collector, and emitter electrodes; a second transistor provided with base, collector, and emitter electrodes; means including two input terminals connected to apply said input potential between said emitter electrodes; transformer means provided with a tapped secondary connected between said base electrodes and a primary winding connected to receive switching potentials therefor, a source of D.-C. potential connected between the tap of said secondary and said collector electrodes of said first and second transistors, and thermo-sensitive resistor means conductively interposed between the opposite ends of said secondary winding and each of said base electrodes circuit means including output terminals connected between one of said input terminals and both collectors to provide an output circuit.

2. In a transistorized chopper circuit for converting a low level unidirectional input voltage to an alternating type output potential; a first transistor provided with base, collector, and emitter electrodes; a second transistor provided with base, collector and emitter electrodes; means including two input terminals connected to apply said input potential between said emitter electrodes; transformer means provided with a tapped secondary connected between said base electrodes and a primary winding connected to receive switching potentials therefor thermo-sensitive resistor means interposed between the each end of said secondary winding and the base of one of said transistors a source of D.-C. potential connected between the tap of said secondary and the collector electrodes of said first and second transistors, and heater means disposed to thermally influence the ambient temperature in and around said chopper circuit means including output terminals connected between one of said input terminals and both collectors to provide an output circuit.

3. In a transistorized chopper circuit for converting an extremely small magnitude unidirectional input voltage level to an alternating type output potential of the same magnitude; a first transistor provided with base, collector and emitter electrodes, a second transistor provided with base, collector and emitter electrodes; means including resistors connected to apply said input voltage between said emitter electrodes; transformer means including a secondary winding connected between said base electrodes and a primary winding adapted to receive a square wave switching potential, a tap on said secondary, biasing means connected between the tap on said secondary and said collector electrodes of said first and second transistors, heater means disposed to thermally influence the ambient temperature in and around said chopper circuit, and a thermo-sensitive resistor having a positive temperature coefficient interposed between each end of said secondary winding and the corresponding base electrode of each transistor, each thermo-sensitive resistor being connected to a common heat sink.

References Cited in the file of this patent

UNITED STATES PATENTS

| | | |
|---|---|---|
| 2,783,384 | Bright et al. | Feb. 26, 1957 |
| 2,862,171 | Freeborn | Nov. 25, 1958 |